United States Patent
Shamshoum et al.

(10) Patent No.: US 6,407,177 B1
(45) Date of Patent: *Jun. 18, 2002

(54) POLYPROPYLENE BLEND

(75) Inventors: Edwar S. Shamshoum, Houston; B. Raghava Reddy, Baytown, both of TX (US); Rolando Paiz, Guatamala City (GT); Michael J. Goins, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/475,315

(22) Filed: Jun. 7, 1995

(51) Int. Cl.⁷ .......................... C08L 23/00; C08L 23/10
(52) U.S. Cl. ................. 525/240; 526/159; 526/170; 526/351; 526/941
(58) Field of Search .................. 525/240; 526/351, 526/941, 159, 170

(56) References Cited

U.S. PATENT DOCUMENTS

| | | | |
|---|---|---|---|
| 3,246,061 A | * | 4/1966 | Blatz |
| 3,268,627 A | * | 8/1966 | Emrick |
| 4,335,225 A | * | 6/1982 | Collette et al. |
| 4,794,096 A | * | 12/1988 | Ewen |
| 4,892,851 A | * | 1/1990 | Ewen et al. ................ 502/104 |
| 5,132,381 A | * | 7/1992 | Winter et al. ............... 526/160 |
| 5,216,095 A | * | 6/1993 | Dolle et al. |
| 5,269,807 A | * | 12/1993 | Liu |
| 5,395,810 A | * | 3/1995 | Shamshoum et al. |
| 5,603,696 A | * | 2/1997 | Williams et al. ............ 525/240 |
| 5,714,256 A | * | 2/1998 | DeLucia et al. ............ 428/373 |
| 5,804,524 A | * | 9/1998 | Reddy et al. ............... 502/113 |
| 6,207,093 B1 | * | 3/2001 | Hanyu et al. ............ 264/210.6 |

FOREIGN PATENT DOCUMENTS

| | | | |
|---|---|---|---|
| EP | 0536104 | | 4/1993 |
| JP | 3-81356 | * | 4/1991 |

OTHER PUBLICATIONS

The American Heritage Dictionary, 2nd College Ed., Houghton Mifflin Co., Boston (1982).*
Ency. of Chem. Tech. –Kirk Othmer– vol. 16–pp. 456–457 (1991).*

* cited by examiner

Primary Examiner—D. R. Wilson
(74) Attorney, Agent, or Firm—William D. Jackson

(57) ABSTRACT

Polymer blends of isotactic polypropylene and syndiotactic polypropylene enhance the processability in film applications. Up to a level of 4% by weight of syndiotactic polypropylene will increase the molecular weight distribution. Up to a level of 13.9% by weight of syndiotactic polypropylene the clarity or haze of biaxially oriented film is improved. Within a range from about 2.34% by weight of syndiotactic polypropylene to about 13.9% by weight the melt flow is higher than that for either a syndiotactic homopolymer or an isotactic homopolymer. Within a range from about 2% by weight of syndiotactic polypropylene to about 13.9% by weight the level of xylene solubles is higher than that for either a syndiotactic homopolymer or an isotactic homopolymer. If appropriate catalysts are selected, a reactor blend may be produced of the desired mixture.

14 Claims, 1 Drawing Sheet

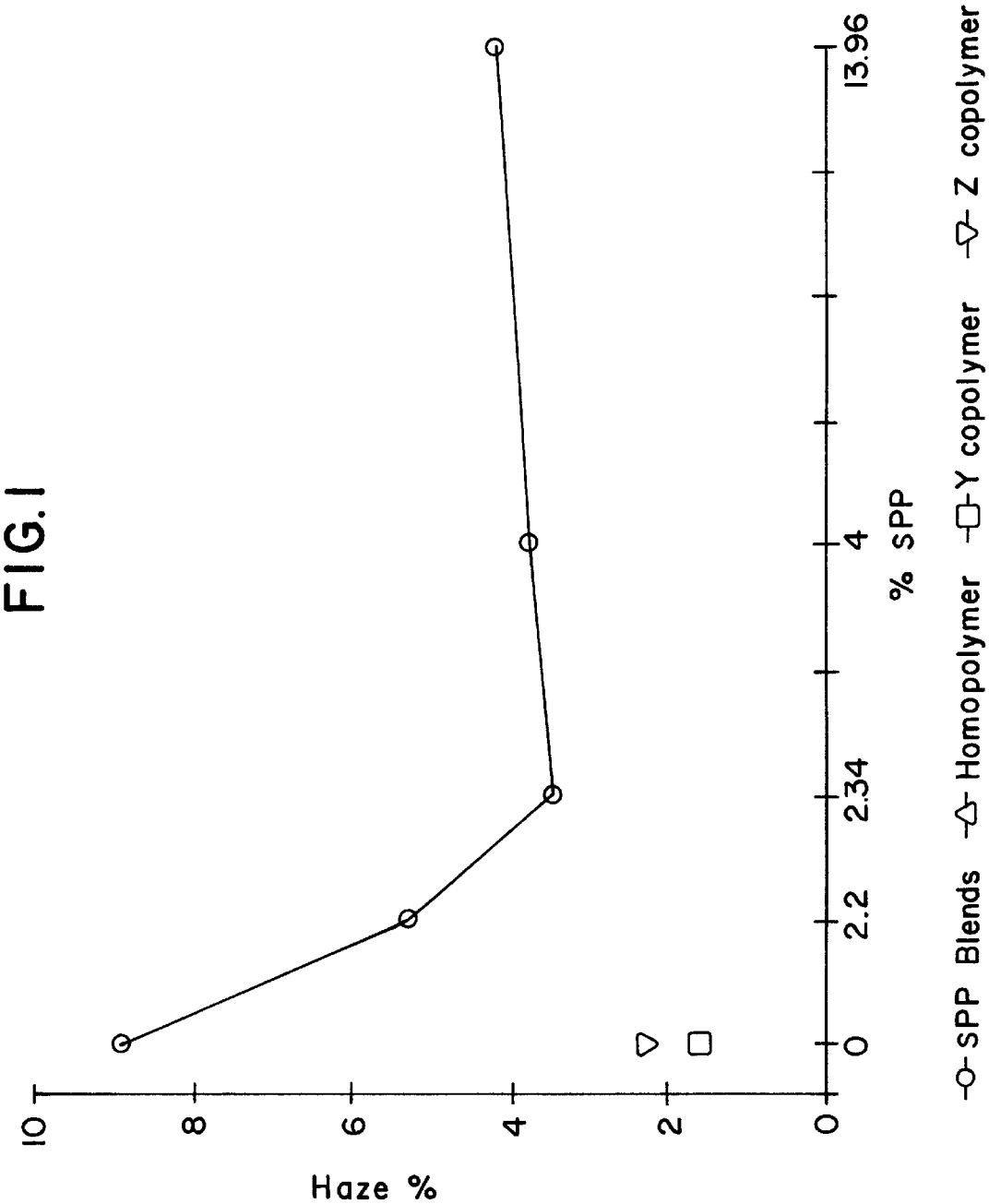

POLYPROPYLENE BLEND

BACKGROUND OF THE INVENTION

1. Field of the Invention

This invention relates to a polymer blend, specifically, to a reactor blend of polypropylenes having different microstructures, i.e., a reactor blend of isotactic polypropylene and syndiotactic polypropylene and a process for making such a blend having increased molecular weight distribution, improved clarity, higher melt flow and higher xylene solubles.

2. Description of the Prior Art

It is known that two or more homogeneous catalysts, such as those based on metallocene compounds, may be combined to effect properties, such as molecular weight distribution. U.S. Pat. No. 4,530,914 discloses use of a catalyst system comprising two or more metallocenes in the polymerization of $\alpha$-olefins, primarily ethylene, to obtain a broad molecular weight distribution. The metallocenes each have different propagation and termination rate constants. The metallocenes are mixed with an alumoxane to form the catalyst system.

It is known that blends of isotactic and syndiotactic polypropylene can be formed with a Ziegler polymerization catalyst as described in Belgian Patent 538,782. As disclosed in U.S. Pat. No. 3,268,627, a mixture of from about 50–97% by weight of isotactic polypropylene and from about 3–50% by weight of a syndiotactic polypropylene can be formed with up to about 20% by weight of atactic polypropylene.

It is also known to produce polymer blends by polymerizing two or more polymerizable materials in two or more reactors arranged in series. As disclosed in U.S. Pat. No. 4,937,299, a polymerizate is produced in a first reactor and then the first polymerizate is passed to a second reactor wherein a second polymerizate is produced thereby obtaining a blend of the first and second polymerizates.

It is also known to produce a reactor blend of polyolefins in a single reactor by use of a homogeneous catalyst system comprising at least two different metallocenes and an alumoxane. As disclosed in U.S. Pat. No. 4,937,299, two different metallocenes can polymerize ethylene and propylene to form an ethylene-propylene copolymer in a single reactor.

It would be advantageous to provide a process to produce a polymer blend of isotactic polypropylene and syndiotactic polypropylene having improved properties over both homopolymers. Furthermore, it would be advantageous to provide a polymer blend which could be produced in a single reactor.

SUMMARY OF THE INVENTION

Accordingly, this invention provides a reactor blend of isotactic polypropylene and syndiotactic polypropylene.

And, an object of this invention is to provide a polymer blend of isotactic polypropylene and syndiotactic polypropylene in a single reactor.

Also, an object of this invention is to provide a polymer blend having up to 4% by weight of syndiotactic polypropylene to produce increased molecular weight distribution.

Further, an object of this invention is to provide a polymer blend having up to 2.34% by weight of syndiotactic polypropylene to improve the clarity or haze of biaxially oriented film.

Additionally, an object of this invention is to provide a polymer blend having from about 2.34% by weight of syndiotactic polypropylene to about 13.9 by weight and a melt flow higher than that for either a syndiotactic homopolymer or an isotactic homopolymer.

As well, an object of this invention is to provide a polymer blend having from about 2% by weight of syndiotactic polypropylene to about 13.9% by weight and a level of xylene solubles that is higher than that for either a syndiotactic homopolymer or an isotactic homopolymer.

These and other objects are accomplished by use of at least one homogeneous catalyst and at least one heterogeneous catalyst, preferably in a single reactor.

BRIEF DESCRIPTION OF THE DRAWINGS

A more complete appreciation of the invention and many of the attendant advantages thereof will be readily understood by reference to the following detailed description when considered in connection with the accompanying drawings.

FIG. 1 is a graph of haze as a function of syndiotactic polypropylene content.

DETAILED DESCRIPTION OF THE INVENTION

Olefins, especially propylene, may be polymerized to form polyolefins in amorphous (atactic) or crystalline forms. Examples of crystalline forms are isotactic and syndiotactic.

Isotactic polypropylene contains principally repeating units with identical configurations and only a few erratic, brief inversions in the chain. Isotactic polypropylene may be structurally represented as

The methyl groups attached to the tertiary carbon atoms of successive monomeric units on the same side of a hypothetical plane through the main chain of the polymer, e.g., the methyl groups are all above or below the plane.

Another way of describing the structure is through the use of NMR. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

A syndiotactic polymer contains principally units of exactly alternating stereoisomers and is represented by the structure:

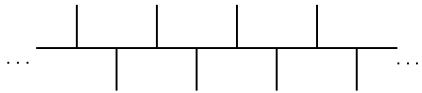

The methyl groups attached to the tertiary carbon atoms of successive monomeric units in the chain lie on alternate sides of the plane of the polymer.

In NMR nomenclature, this pentad is described as . . . rrrr . . . in which each "r" represents a "racemic" dyad, i.e., successive methyl groups on alternate side of the plane. The percentage of r dyads in the chain determines the degree of syndiotacticity of the polymer. Syndiotactic polymers are crystalline and like the isotactic polymers are insoluble in xylene. This crystallinity distinguishes both syndiotactic and isotactic polymers from atactic polymer that is soluble in xylene.

A polymer chain showing no regular order of repeating unit configurations is an atactic polymer. In commercial applications, a certain percentage of atactic polymer is typically produced with the crystalline form. One indication of the amount of atactic polymer is amount of polymer soluble in hot xylene (xylene solubles).

A multi-catalyst system for the polymerization of propylene in which separate polymerizations with a homogeneous catalyst and with a heterogeneous catalyst are possible. Preferably, the multi-catalyst system is useful in the polymerization of olefins, more preferably, α-olefins, and, most preferably, propylene. This catalyst system is disclosed in U.S. Ser. No. 776,498 filed Oct. 11, 1991, U.S. Pat. No. 5,254,517 hereby incorporated by reference.

A multi-catalyst system of the present invention is obtained by mixing the components of at least one metallocene catalyst and at least one conventional supported Ziegler-Natta catalyst. Generally, the components of a metallocene catalyst are a metallocene compound and an ionizing agent. Generally, the components of a conventional supported Ziegler-Natta catalyst are an aluminum alkyl and a transition metal compound with, optionally, an electron donor.

Any of the conventional heterogeneous Ziegler-Natta transition metal compound catalyst components for producing isotactic polyolefins can be used in the present invention. The compound is preferably of the general formula $MR^+_x$ where M is the metal, $R_+$ is a halogen or a hydrocarboxyl and x is the valence of the metal. Preferably, M is a Group IVB, VB or VIB metal, more preferably a Group IVB, and most preferably titanium. Preferably, $R^+$ is chlorine, bromine, an alkoxy or a phenoxy, more preferably chlorine or ethoxy and most preferably, chlorine. Illustrative examples of the transition metal compound catalyst components are $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The transition metal compound is supported on an inert solid which is chemically unreactive with any of the components of the heterogeneous or homogeneous catalyst. The support is preferably a magnesium compound. Examples of the magnesium compounds which are to be used to provide a support source for the catalyst component are magnesium halides, dialkoxymagnesiums, alkyoxymagnesium halides, magnesium oxyhalides, dialkylmagnesiums, magnesium oxide, magnesium hydroxide, and carboxylates of magnesium.

The aluminum alkyl is of the general formula $AlR^{\#}_3$ where $R^{\#}$ is an alkyl of from 1–8 carbon atoms and $R^{\#}$ may be the same or different. Examples of aluminum alkyls are trimethyl aluminum (TMA), triethyl aluminum (TEAl) and triisobutyl aluminum (TiBAl). The preferred aluminum alkyl is TEAl.

The electron donor is any one of the electron donors which are effective with conventional supported Ziegler-Natta catalysts. Typically, an electron donor is an organosilicon compound. Examples of electron donors are cyclohexylmethyldimethyoxysilane (CMDS), diphenyldimethoxy silane (DPMS) and isobutyltrimethoxy silane (IBMS). Other examples of electron donors are disclosed in U.S. Pat. Nos. 4,218,339; 4,395,360; 4,328,122; 4,473,660; 4,562,173 and 4,547,552, which are hereby incorporated by reference.

The metallocene catalyst is formed from a neutral metallocene compound, i.e., a metal derivative of a cyclopentadiene. The metallocene compound useful in the present invention contains two cyclopentadiene rings and is of the general formula:

wherein $(C_5H_4)$ is a cyclopentadienyl ring and $(C_4H_{4-m}R'_mC_5C_4H_{4-n}R'_n)$ is a substituted cyclopentadienyl ring preferably, a fluorenyl ring or a substituted fluorenyl ring, the substituent preferably being alkyl, alkoxy, dialkylamino, halogens, cycloalkyl or aryl; R' is a hydrocarbyl radical, halogen, an alkoxy, an alkoxy alkyl or an alkylamino radical having from 1–20 carbon atoms, each R' may be the same or different; R" is a structural bridge between the $(C_5H_4)$ and $(C_4H_{4-m}R'_mC_5C_4H_{4-n}R'_n)$ rings to impart stereorigidity and, preferably, is an alkylene radical having 1–4 carbon atoms, or arylaklyl or diaryl alkyl radical contains 7–20 atoms, a silicon hydrocarbyl compound, a germanium hydrocarbyl compound, an alkyl phosphine, or an alkyl amine; Q is a hydrocarbon radical, such as an alkyl, aryl, alkenyl, alkylaryl or arylalkyl radical having 1–20 carbon atoms, or is a halogen; Me is a Group IIIB, IVB, VB, or VIB metal as positioned in the Periodic Table of Elements; $0 \leq m \leq 4$; $0 \leq n \leq 4$; and p is the valence of Me minus 2.

The cyclopentadienyl rings $(C_5H_4)$ and $(C_4H_{4-m}R'_mC_5C_4H_{4-n}R'_n)$ must have bilateral or pseudo-bilateral symmetry. Bilateral symmetry is defined as the condition in which there is no substituents or one or more substituents on one side and no substituents or one or more substituents on the other side in the same relative position such that a mirror image is formed from one side to another. Pseudobilateral symmetry is defined as symmetry such that a mirror image exists from one side to the other in regard to the existence and position of substituents but the substituents themselves are not identical.

The metallocene catalyst is syndiotactic specific or syndiospecific. Such catalyst are described in U.S. Pats. Nos. 4,895,851; 5,162,278; 5,155,080; 5,132,381 and European Patent Application Publication Nos. 0 387 609; 0 387 690; 0 387 691; and PCT International Publication No. WO 92/1218, all of which are hereby incorporated by reference.

The ionizing agent is an alumoxane, an aluminum alkyl, other Lewis acid or a combination thereof which will ionize a neutral metallocene compound to form a cationic metallocene catalyst. An example of an ionizing agent useful in the present invention is methyl alumoxane (MAO).

Reactor blends for purposes of this invention are mixtures of two different microstructures of polypropylene having different physical properties which are produced together in a single polymerization reactor. Catalysts employed in the production of such a polymer blend under steady state conditions in one reactor will comprise two or more distinct catalysts, one predominately catalyzing the formation of one microstructure of polypropylene and the other predominately catalyzing the formation of the other microstructure of polypropylene.

The blends of the present invention are of isotactic polypropylene and syndiotactic polypropylene. Varying the level of syndiotactic polypropylene affects the molecular weight distribution, the clarity or haze of biaxially oriented film, melt flow and xylene solubles.

The invention having been generally described, the following examples are given as particular embodiments of the invention and to demonstrate the practice and advantages thereof. It is understood that the examples are given by way of illustration and are not intended to limit the specification or the claims to follow in any manner.

Preparation of Supported Metallocene Catalyst

Under nitrogen, a slurry of dry silica in dry toluene is treated with methylalumoxane (MAO) dissolved in toluene while keeping the MAO/silica weight ratio at about 0.2–1.0. The mixture is heated under reflux for four hours and the liquid is decanted. The solid is washed with several portions of toluene and dried. Under nitrogen, metallocene dissolved in toluene is added to a slurry of MAO treated silica in toluene (2–10% by weight of metallocene based on the MAO treated silica). Upon completion of the reaction, the solid is isolated and washed further with hexane and dried. When a syndiospecific metallocene is used, a purple solid is obtained. The solid is stored under an inert atmosphere and away from light. The ratio of metallocene to MAO-treated silica is kept in the range of 2–10% by weight.

EXAMPLE 1

7.7 mmoles of a 5:1 molar mixture of triethylaluminum (TEAl) and triisobutylaluminum (TIBAl) in 7.7 ml hexane/heptane mixture (1:3 volume ratio) were placed in a stainless steel bomb along with 0.05 mmole of cyclohexylmethyldimethoxysilane (CMDS) and mixed by shaking. A mineral oil slurry of 30 mg of a conventional supported Ziegler-Natta catalyst component was introduced into the transfer bomb followed by a mineral oil slurry of 33 mg of diphenylmethyl (fluorenyl) (cyclopentadienyl) zirconium dichloride supported on MAO-treated silica prepared as described above. The contents of the transfer bomb were mixed and charged along with 750 g of propylene into a 2 liter Zipperclave reactor containing 750 g of propylene and 32 mmoles hydrogen. The reactor mixture was stirred at room temperature for 7 minutes and the temperature was increased to 60° C. The polymerization continued for one hour at 60° C. At the end of this time polymerization was terminated by rapidly venting the reactor of unreacted monomer. The polymer analysis is shown in Table 1.

Molecular weight distribution (MWD) is the ratio of the weight average molecular weight ($M_w$) to the number average molecular weight ($M_n$): MWD=$M_w/M_n$. This ratio is also known as polydispersity.

Xylene solubles are measured by dissolving the polymer in hot xylene, cooling the solution to 0° C. and precipitating out the isotactic form. The xylene solubles are the wt % of the polymer that was soluble in the cold xylene.

The percent SPP was determined by NMR analysis.

EXAMPLE 2

The procedures of Example 1 were repeated except that 69 mg of the supported metallocene catalyst, 9.4 mmole of the TIBAl/TEAl mixture and 0.065 mmole of CMDS were used. The polymer analysis is shown in Table I.

EXAMPLE 3

The procedures of Example 1 were repeated except that 133 mg of the supported metallocene catalyst, 12,8 mmole of the TIBAl/TEAl mixture and 0.086 mmole of CMDS were used. The polymer analysis is shown in Table I.

EXAMPLE 4

The procedures of Example 1 were repeated except that 266 mg of the supported metallocene catalyst, 18.7 mmole TIBAl/TEAl mixture and 0.125 mmole of CMDS were used. The polymer analysis is shown in Table I.

Comparative Example 1

The procedures of Example 1 were repeated except that only the conventional Ziegler-Natta (isospecific) catalyst was present. The polymer analysis is shown in Table I.

Comparative Example 2

The procedures of Example 1 were repeated except that only the supported metallocene (syndiospecific) catalyst was present. The polymer analysis is shown in Table I.

TABLE I

| EXAMPLE | % sPP | MWD (Mw/Mn) | Melt Flow Index (g/10 min) | Xylene Solubles (%) |
| --- | --- | --- | --- | --- |
| 1 | <2 | 9.0 | 2.9 | 3.6 |
| 2 | 2.34 | 9.6 | 4.0 | 4.6 |
| 3 | 4.0 | 8.2 | 3.5 | 3.9 |
| 4 | 13.9 | 8.3 | 4.7 | 5.4 |
| Comp. Ex 1 | 100 | 2.4 | 3.5 | 3.2 |
| Comp. Ex 2 | 0% | 8.4 | 2.1 | 2.4 |

Solution blends in different ratios of pure syndiotactic and pure isotactic polymers were made and the solvent was removed. The resulting solid was analyzed for tacticity by C-13 NMR. Calibration curves were constructed using the pentad values for different blends. The composition of the reactor blends obtained from Examples 1–4 was determined by comparison of their pentad content to calibrated graphs.

The present invention provides a polymer blend having increased molecular weight distribution. As shown in Table I, the molecular weight distribution of a polymer blend having less than about 4.0% by weight of the syndiotactic polymer, i.e., a Ti:Zr molar ratio ranging up to about 0.48:1, is from about 8.2 to about 9.6. The molecular weight distribution of syndiotactic polypropylene alone is 2.4 and the molecular weight distribution of isotactic polypropylene alone is 8.4. Polymer blends of syndiotactic polypropylene and isotactic polypropylene have molecular weight distribution greater than either a syndiotactic homopolymer or an isotactic homopolymer. It should be noted that measurement of polydispersity can vary depending on the catalyst which produced the polymer and the instrument which is used. The molecular weight distribution of 8.2 would have an estimated variance of +/−1 and the molecular weight distribution of 9.6 would have an estimated variance of 1.5. However, since these measurements were taken on the same machine using the same procedure at or near the same time, they represent a comparison of relative values to each other.

The present invention provides a polymer blend having high xylene solubles. As shown in Table I, the xylene solubles of a polymer blend within a range from about 2% by weight of syndiotactic polypropylene to about 13.9% by weight, i.e., a Ti:Zr molar ratio ranging up to about 0.21:1, ranges from 3.6% by weight to 5.4% by weight. The percent xylene solubles of syndiotactic polypropylene alone is 3.2% and the percent xylene solubles of isotactic polypropylene alone is 2.4%. Polymer blends of syndiotactic polypropylene and isotactic polypropylene have a level of xylene solubles higher than that for either a syndiotactic homopolymer or an isotactic homopolymer.

The present invention provides a polymer blend having high melt flow. As shown in Table I, the melt flow index of a polymer blend within a range from about 2.34% by weight of syndiotactic polypropylene to about 13.9% by weight, i.e., a Ti:Zr molar ratio ranging from 0.8:1 to 0.21:1, is from about 3.5 g/10 min to about 4.7 g/10 min. The melt flow index of syndiotactic polypropylene alone is 3.5 g/10 min and the melt flow index of isotactic polypropylene alone is 2.1 g/10 min. Polymer blends of syndiotactic polypropylene and isotactic polypropylene have a melt flow that is higher than that for either a syndiotactic homopolymer or an isotactic homopolymer.

EXAMPLE 5

The film of 0.6 mil thickness was prepared in a two stage draw process. The polymer blend stabilized with 0.1 wt. % calcium stearate, 0.05 wt. % 1,3,5-tris(4-tert-butyl-3-hydroxy-2,6-dimethylbenzyl)-1,3,5-triazine-2,4,6-(1H,3H, 5H)-trione (tradename of American Cyanamid Company—Cyanox 1790) and 0.05 wt. % bis(2,4-di-t-butylphenyl) pentaerythritol diphosphite (tradename of G.E. Specialty Chemicals—Ultranox 626). The mixture was plastified and compressed in an extruder. The melt was then extruded through a flat sheet die and brought into contact with a cooling cylinder. The polymer sheet so produced is a biaxially drawn, i.e., longitudinally and transversely with respect to the direction of extrusion, at temperatures below the melting point of the polymer blend. The draw ratio in the longitudinal direction is at least 4:1 and the product of the longitudinal and transverse draw ratios is at least about 16:1.

The clarity or haze was determined by measuring light deflected from the path of incident light due to light scattering by the haze of the sample using the XL211 Hazegard® system manufactured by Pacific Scientific. The results are shown in FIG. 1.

The present invention provides a polypropylene composition for improved clarity or haze in a biaxially oriented film. As shown in FIG. 1, the percent haze of a polymer blend within a range from less than about 2.0% by weight of syndiotactic polypropylene to about 13.9% by weight, i.e., a Ti:Zr molar ratio up to about 0.21:1 or, more particularly, a Ti:Zr molar ratio from about 1.7:1 to about 0.21:1, is from about 3% to about 5%. The % haze of isotactic polypropylene homopolymer is 9% and of syndiotactic polypropylene homopolymer is 2%. Polymer blends of syndiotactic polypropylene and isotactic polypropylene have haze values that are better than that for an isotactic homopolymer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A polymer blend comprising a reactor blend of:
    a) isotactic polypropylene;
    b) syndiotactic polypropylene characterized by a polymer chain containing principally racemic diads and being produced by a syndiospecific metallocene catalyst having bilateral or pseudobilateral symmetry;
    wherein the syndiotactic polypropylene is from less than about 2% up to about 4% by weight and wherein the molecular weight distribution is from about 7.4 to about 11.1.

2. A process for obtaining a reactor polymer blend comprising:
    a) allowing a conventional titanium-based Ziegler-Natta catalyst component, a zirconium-based metallocene compound supported on silica treated with an alumoxane and an organoaluminum compound to contact each other to form activated catalysts in a reaction zone wherein the ratio of the conventional Ziegler-Natta catalyst component to metallocene compound as given by a Ti:Zr molar ratio ranging up to about 0.48:1;
    b) introducing propylene to the reaction zone;
    c) maintaining the reaction zone at polymerization conditions;
    d) withdrawing a polymer blend of isotactic polypropylene and syndiotactic polypropylene characterized by a polymer chain containing principally racemic diads and being produced by a syndiospecific metallocene catalyst having bilateral or pseudobilateral symmetry;
    wherein the syndiotactic polypropylene is up to about 4% by weight and wherein the molecular weight distribution is within the range of about 7.4 to about 11.1.

3. The process of claim 2 wherein the syndiotactic polypropylene is less than about 2% by weight.

4. A biaxially oriented film comprising a reactor polymer blend of:
    a) isotactic polypropylene;
    b) syndiotactic polypropylene characterized by a polymer chain containing principally racemic diads and being produced by a syndiospecific metallocene catalyst having bilateral or pseudobilateral symmetry;
    wherein the syndiotactic polypropylene is from about 2.34% to up to about 10% by weight and
    wherein the percent haze of the film is less than about 5%.

5. The biaxially oriented film of claim 4 wherein the percent haze is from about 3% to about 5%.

6. A process for obtaining a reactor polymer blend comprising:
    a) allowing a conventional titanium-based Ziegler-Natta catalyst component, a zirconium-based metallocene compound supported on silica treated with an alumoxane and an organoaluminum compound to contact each other to form activated catalysts in a reaction zone wherein the ratio of the conventional Ziegler-Natta catalyst component to metallocene compound as given by a Ti:Zr molar ratio up to about 0.21:1;
    b) introducing propylene to the reaction zone;
    c) maintaining the reaction zone at polymerization conditions;
    d) withdrawing a polymer blend of isotactic polypropylene and syndiotactic polypropylene characterized by a polymer chain containing principally racemic diads and being produced by a syndiospecific metallocene catalyst having bilateral or pseudobilateral symmetry;
    wherein the syndiotactic polypropylene is up to about 10% by weight and
    e) making a biaxially oriented film
    wherein the percent haze of the film is less than about 5%.

7. The process of claim 6 wherein the syndiotactic polypropylene is from about 2.34 to about 13.9% by weight.

8. The process of claim 6 wherein the percent haze is from about 3% to about 5%.

9. A polymer blend comprising a reactor blend of:
    a) isotactic polypropylene;
    b) syndiotactic polypropylene characterized by a polymer chain containing principally racemic diads and being produced by a syndiospecific metallocene catalyst having bilateral or pseudobilateral symmetry;
    wherein the syndiotactic polypropylene is within a range from about 2.34% by weight to about 10% by weight and
    wherein the melt flow is above about 3.5 g/10 min and the molecular weight distribution is from about 7.4 to about 11.1.

10. The polymer blend of claim 9 wherein the melt flow is from about 3.5 g/10 min to about 4.7 g/10 min.

11. A process for obtaining a reactor polymer blend comprising:
    a) allowing a conventional titanium-based Ziegler-Natta catalyst component, a zirconium-based metallocene compound supported on silica treated with an alumoxane and an organoaluminum compound to contact each other to form activated catalysts in a reaction zone wherein the ratio of the conventional Ziegler-Natta catalyst component to metallocene compound as given by a Ti:Zr molar ratio ranging from 0.8:1 to 0.21:1;

b) introducing propylene to the reaction zone;

c) maintaining the reaction zone at polymerization conditions;

d) withdrawing a polymer blend of isotactic polypropylene and syndiotactic polypropylene characterized by a polymer chain containing principally racemic diads and being produced by a syndiospecific metallocene catalyst having bilateral or pseudobilateral symmetry;

wherein the syndiotactic polypropylene is within a range from about 2.34% by weight to about 10% by weight and wherein the melt flow is above about 3.5 g/10 min and the molecular weight distribution is from about 7.4 to about 11.1.

12. A polymer blend comprising a reactor blend of:

a) isotactic polypropylene;

b) syndiotactic polypropylene characterized by a polymer chain containing principally racemic diads and being produced by a syndiospecific metallocene catalyst having bilateral or pseudobilateral symmetry;

wherein the syndiotactic polypropylene is within a range from less than about 2% by weight to about 10% by weight and wherein the level of xylene solubles is above about 3.2% by weight and the molecular weight distribution is from about 7.4 to about 11.1.

13. The polymer blend of claim 12 wherein the level of xylene solubles is within a range from about 3.4% by weight to about 5.4% by weight.

14. A process for obtaining a reactor polymer blend comprising:

a) allowing a conventional titanium-based Ziegler-Natta catalyst component, a zirconium-based metallocene compound supported on silica treated with an alumoxane and an organoaluminum compound to contact each other to form activated catalysts in a reaction zone wherein the ratio of the conventional Ziegler-Natta catalyst component to metallocene compound is as given by a Ti:Zr molar ratio ranging up to about 0.21:1;

b) introducing propylene to the reaction zone;

c) maintaining the reaction zone at polymerization conditions;

d) withdrawing a polymer blend of isotactic polypropylene and syndiotactic polypropylene characterized by a polymer chain containing principally racemic diads and being produced by a syndiospecific metallocene catalyst having bilateral or pseudobilateral symmetry;

wherein the syndiotactic polypropylene is within a range from about 2% by weight to about 10% by weight and wherein the level of xylene solubles is above about 3.2% by weight and the molecular weight distribution is from about 7.4 to about 11.1.

* * * * *